United States Patent [19]
Luong et al.

[11] 3,805,018
[45] Apr. 16, 1974

[54] PORTABLE FOOD STORAGE AND WARMER CARRYING CASE

[76] Inventors: Tri Luong; Jit K. Luong, both of 1477 Mallard Way, Sunnyvale, Calif. 94087

[22] Filed: Mar. 12, 1973

[21] Appl. No.: 340,222

[52] U.S. Cl............ 219/387, 99/329, 99/359, 206/46 R, 219/430, 219/439, 219/521, 220/17
[51] Int. Cl........................ A21b 1/52, F27d 11/02
[58] Field of Search ........... 219/385, 386, 387, 430, 219/432, 439, 521; 99/328, 329, 359; 220/17; 206/46 F, 46 C, 46 R

[56] References Cited
UNITED STATES PATENTS

| | | | |
|---|---|---|---|
| 3,482,078 | 12/1969 | Milne | 219/387 |
| 3,385,952 | 5/1969 | Mix | 219/387 |
| 3,610,884 | 10/1971 | Evans et al. | 219/439 |
| 3,736,981 | 6/1973 | Shevlin | 219/387 X |
| 2,279,000 | 4/1942 | Larson | 219/439 |
| 2,644,072 | 6/1953 | Aruth | 219/521 X |
| 3,048,267 | 8/1962 | Starzec | 206/46 FC |
| 3,130,288 | 4/1964 | Monaco et al. | 219/385 |
| 3,573,430 | 4/1971 | Eisler | 219/385 |
| 3,613,872 | 10/1971 | Donnelly | 220/17 |
| 3,038,058 | 6/1962 | Gordon, Jr. | 219/521 X |

*Primary Examiner*—Volodymyr Y. Mayewsky
*Attorney, Agent, or Firm*—Schatzel & Hamrick

[57] ABSTRACT

A portable carrying case for carrying food and food warmer apparatus. The case is adapted to store a supply of food and provide a means for warming said food. The case includes a main casing with an internal cavity for storing a supply of heating fluid and a heating element for heating said fluid. A food storage container is positioned within said cavity. Said container forms a storage well within which food may be stored. The exterior walls of said container well are adapted to be at least partially submerged in said fluid such that heat from the liquid may be transferred from the fluid to the interior of the food container storage well.

9 Claims, 6 Drawing Figures

3,805,018

PORTABLE FOOD STORAGE AND WARMER CARRYING CASE

BACKGROUND OF THE INVENTION

The present invention relates in general to food containers and food heating units. More particularly the invention relates to a portable carrying case unit for carrying food and a heating unit for warming said food at the convenience of the diner.

It is a common practise for individuals to carry lunches or other meals in containers for consumption away from the home. For example, employees frequently carry lunches in bags or carrying cases so as to provide them with a meal at their place of employment during the working time period. The food, when consumed is generally at room temperature except for liquids, e.g., coffee, tea, milk, soup, etc. carried in thermos containers which retain the liquids at a temperature near that of when the liquid was placed in the container. Frequently, the individual would prefer to have solid food which can be carried from home and warmed above room temperature immediately prior to consumption without undue inconvenience.

SUMMARY OF THE PRESENT INVENTION

The present invention provides a portable carrying case for carrying food and a means for warming said food immediately prior to consumption of said food. The case is adapted such that it may take the form of a substantially rectangular brief case or other form to be compatible with the life style of the individual.

In an exemplary embodiment, the case forms an internal cavity for encompassing a supply of heating fluid. An electrical heating element is positioned within said cavity and submerged in said fluid to heat the fluid when electrical power is supplied to the element. A food storage container, forming a plurality of well compartments is suspended within the cavity such that the exterior walls of each compartment are at least partially submerged in said fluid whereby heat may be transferred from said element to said liquid, to the side walls of the compartments and then to the interior of the compartments. The container is sealed about its periphery to the side walls forming the cavity to discourage the escape of heat and said heating fluid.

DESCRIPTION OF THE PREFERRED EMBODIMENTS

Figure 1:
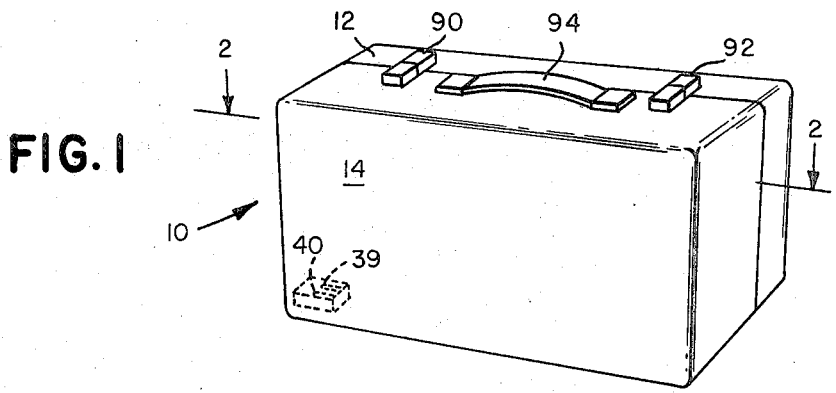
FIG. 1 is a perspective view of the exterior of the carrying case of the present invention when said case is in position for carrying by an individual.

Referring to the drawings, FIGS. 1–16 illustrate a portable carrying case of the present invention and referred to by the general reference character 10, for carrying a supply of food and a warmer unit. FIG. 1 illustrates the case 10 as it appears from the exterior when closed and arranged for carrying by an individual. The case 10 includes a flat rectangular cover 12 and a flat rectangular main carrier 14 such that the case takes the form of a businessman's attache case. The cover 12 and the carrier 14 are preferably comprised of an insulative, shock-resistant material, e.g., a thermoplastic. An internal cavity 16 is formed by the carrier 14 to store a supply of heating fluid, e.g., liquid mineral oil. Mineral oil has been found to function highly satisfactorily as the boiling temperature is significantly greater than that of water and only a small quantity is necessary. Furthermore, the oil does not readily evaporate. A heating element assembly 18 is positioned about the bottom wall of the carrier 14 to be submerged in the heating fluid. The heating element assembly 18 comprises a flat plate 20 of non-conductive material, e.g., thermoplastic with a pair of longitudinal serrated edges 22 and 24. A plurality of oblong cutouts 26 are formed within the plate 20 to permit the heating fluid to readily circulate about the top and bottom surface of the plate. Attached about one end of the plate 20 are a pair of spaced apart metal strips 28 and 29 to establish an electrical terminal means for receiving a power source. The strips 28 and 29 are secured to the plate 20 by a pair of conductive rivets 30 and 31, respectively. Soldered to the rivet 30 is a conductive wire 32 which extends longitudinally over the bottom side of the plate 20 towards the opposite end thereof. The wire 32 is in turn engaged to a coil 34 which is wrapped laterally around the plate 20 in engagement with the notches of the serrated edges 22 and 24. In series with the wire 34 is a thermostat 36 which provides a means for controlling the current through the coil 34 responsive to the maximum temperature of the heating fluid. The other terminal end of the wire 34 is soldered to the rivet 31 thereby establishing a continuous circuit between the terminals 28 and 29. The heating element assembly 18 is secured above the bottom wall of the main case 14 by a plurality of projecting bosses 37 and secured thereto by a plurality of screws 38. The heating element assembly 18, in position, extends substantially end-to-end longitudinally and end-to-end laterally about the bottom wall of the main container 14 so as to provide a substantially uniform amount of heat across the cross-section area of the fluid containing cavity 16. The strips 28 and 29 are respectively secured to a pair of banana plugs 39 and 40 which are embedded within a side wall of the main carrier 14 adjacent one corner thereof. The banana plugs 39 and 40 protrude to the exterior of the main case 14 so as to be in position to receive a female type plug from an electrical power source.

Figure 2:
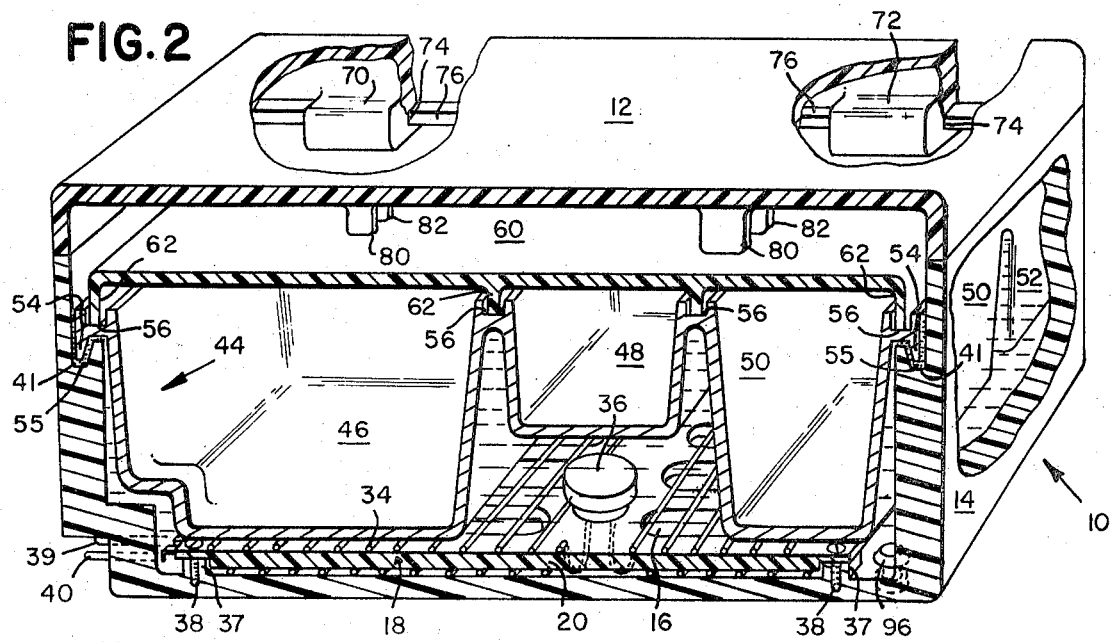
FIG. 2 is a perspective view of the unit of FIG. 1 taken along the line 2—2 when said case is in position for use in heating food contained therein.
Figure 3:
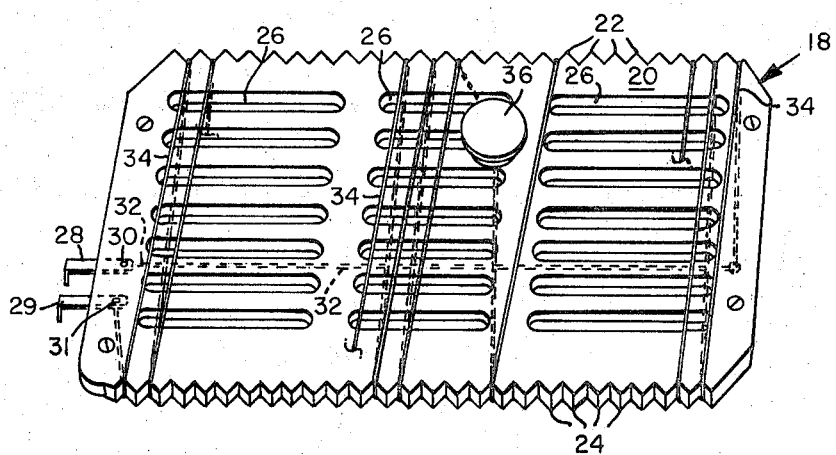
FIG. 3 is a perspective view of the heating element of the unit of FIG. 1.
Figure 4:
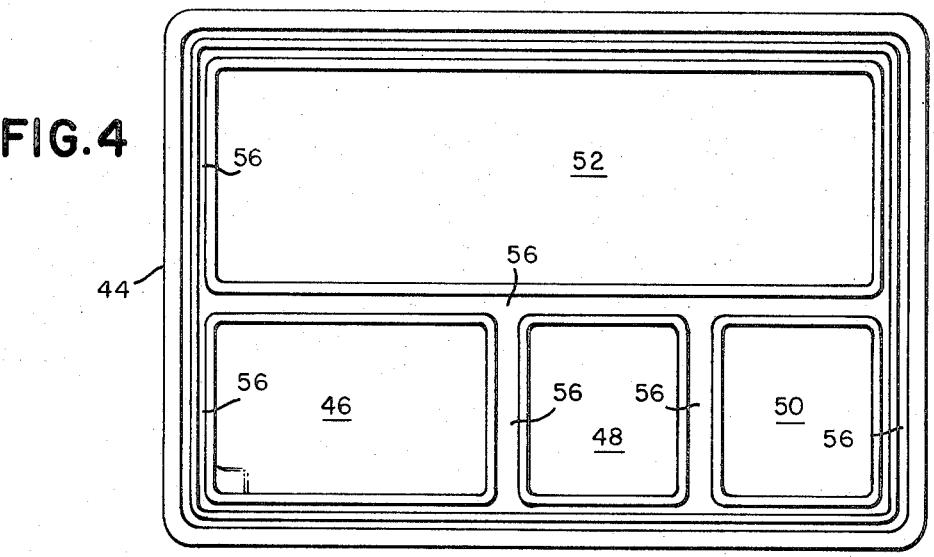
FIG. 4 is a top view of the unit of FIG. 1 with the casing cover and food compartment cover removed.

Around the periphery of the interior of the side walls of the main case 14 is a groove 41. The groove 41 extends around the entire periphery of the interior of the side walls of said casing. A food supply container 44, adapted for storing a supply of food, is positioned within the cavity 16. The container 44 is preferably comprised of a conductive material, e.g., stainless steel, aluminum, etc. The container 44, as illustrated, contains four separate food storage well compartments 46, 48, 50 and 52 of varying sizes. FIG. 2 illustrates a side view of a cross-section of the compartments 46, 48 and 50 and FIG. 4 illustrates a top view of all the storage compartments 46, 48, 50 and 52. The food supply container 44 is a unitary structure of which the individual compartments are designed such that the bottom wall of each compartment is above a portion of the heating element 18. There is a spacing intermediate the exterior sidewalls of adjacent compartments to permit heating fluid to surround the exterior periphery of each compartment. The compartments may be of various sizes and depths such that the amount of heating fluid about the outer periphery varies dependent upon the size of the individual compartments. Each of the compartments carries interior tapered side walls so that the interior of the compartments may be easily cleansed. About the outer periphery and adjacent the top edge of the food container 44 is a tongue 54. The tongue 54 extends around the entire periphery of the container 44 and is adapted to slide within the groove 41 to form a tongue-and-groove seal. The coaction of the tongue 54 and groove 41 further functions as a suspension support for supporting and suspending the container 44 within the cavity 16 such that the exterior of each of the food storage compartments is at least partially submerged in the heating fluid. An adhesive sealant 55 seals the tongue 54 within the groove 40 so as to preclude leakage of fluid from within the cavity 16 to the interior of the food compartments.

Figure 5:
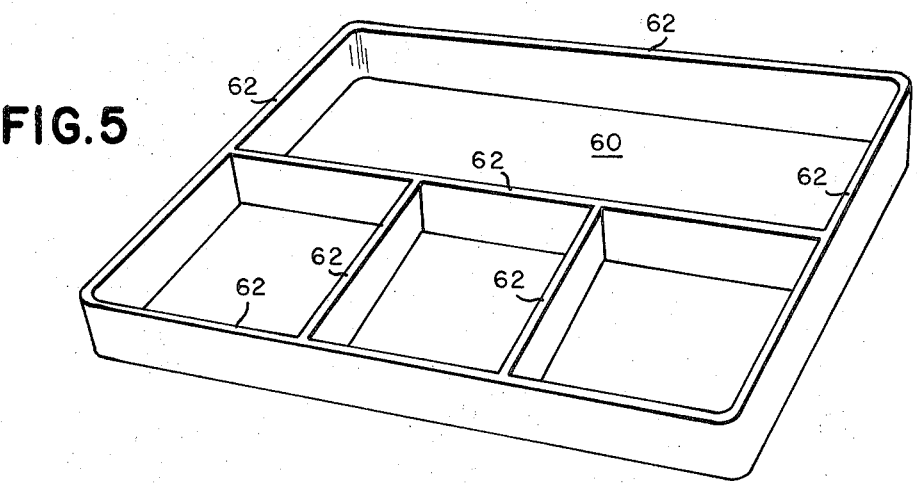
FIG. 5 is a bottom side, perspective view of the food compartment cover.

The top peripheral edge of each of the compartments forms a groove 56 as illustrated in FIGS. 2 and 4. Over the food container 44 is a cover 60. The container cover 60 carries a projecting tongue 62 as illustrated in FIGS. 2 and 5. The projecting tongue 62 establishes a pattern coinciding with the pattern of the grooves 56 of the food container 44. With the cover 60 in position to cover the top side of the food container 44, the projections 62 engage the grooves 56 to form a tongue and groove relationship in turn aiding the sealing of the food compartments. The cover 60 may be comprised of a conductive or insulative material.

The casing cover 12 is adapted to be secured to the main casing 14 and fit over the top of the food storage container cover 60. The casing cover 12, which may be of the same material and design as the main casing 14, carries a pair of frictional engageable hinges 70 and 72 secured about the back edge of the cover. The hinges 70 and 72 form a U-shaped groove 74 to receive a tongue 76 extending across the back edge of the main carrier 14 and projecting laterally therefrom. Accordingly, to secure the cover 12 to the main carrier 14 the hinges 70 and 72 are guided such that the groove 74 engages the projection 76 in a tongue-and-groove fashion.

Figure 6:
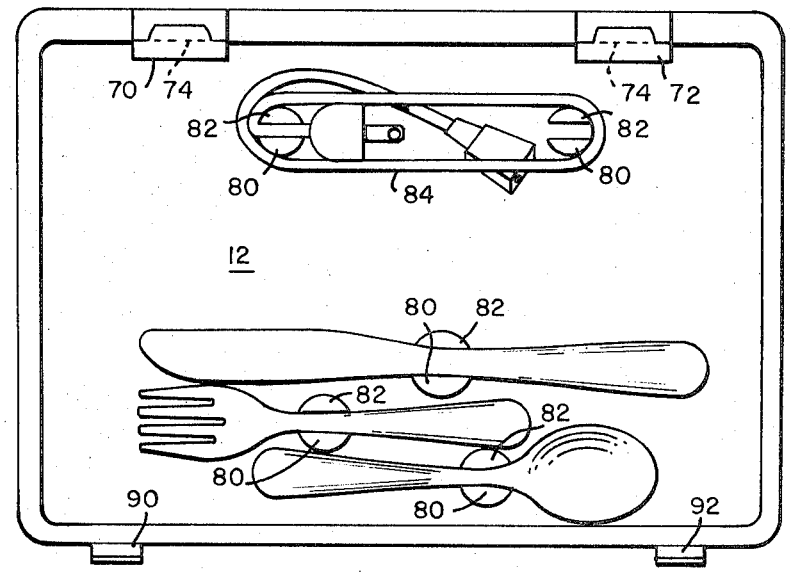
FIG. 6 is a bottom side, perspective view of the casing cover of FIG. 1.

Viewing FIGS. 2 and 6, projecting from the interior of the top wall of the cover 12 are a plurality of pairs of spaced apart bosses 80 and 82. Each pair of the bosses 80 and 82 form a pressure clamp and are positioned to frictionally support eating utensils intermediate each pair of bosses 80 and 82. Two pair of the bosses are positioned to receive a power cord 84 adapted to be connected to the banana plugs 39 and 40 and an electrical outlet plug. The bosses 80 and 82 are selected of a length to permit their making frictional contact with the top surface of the cover 60 when the cover is in place over the food container 44 with the projections 62 in the grooves 56. This provides for securing the cover 60 in place while the carrier is being transported.

The cover 12 and main casing 14 further carry latch means 90 and 92 to secure the cover 12 in place relative to the main carrier case 14. A handle 94 is secured to the main carrier case 14 to permit an individual to hand carry the case 10. A removable stopper plug 96 (See FIG. 2) is engaged to the main carrier case 14 to permit drainage of the heating fluid from the cavity 16 as desired. The plug further functions as a safety release in the event the heating fluid becomes too hot.

In utilizing the case 10 for storing a supply of food and heating said food, a supply of heating liquid is placed within the cavity 16 and a supply of food is placed in the individual compartments 46, 48, 50 or/and 52 as desired. The individual may carry the case in a manner similar to that of an attache or brief case. Immediately prior to the time that the individual desires to consume the food, the power cord 84 is joined to the banana plugs 28 and 30 and to an electrical power source such that the coil 34 is excited and heated. The heated coil 34 in turn heats the heating fluid surrounding the individual food compartments 46, 48, 50 and 52. Heat, in turn, penetrates the side walls of the compartments to the food contained therein. The thermostat 36, which is in series with the heating coil 34, regulates the maximum temperature which the heating fluid may assume. The temperature is preferably retained at a value less than the boiling temperature of the heating fluid.

What is claimed is:

1. A portable food storage and warmer carrying case comprising:

a hand carriable case including a main casing of thermally non-conductive material forming an internal cavity for encompassing a supply of liquid heating fluid and a removable case cover means engaged to the main casing to permit the opening and closing of access to the interior of said main casing;

an electrical heating element means supported within the confines of said cavity for heating said supply of liquid and electrically insulated from the liquid, the heating element means being engaged to terminal means embedded in said casing and extending from the cavity to the exterior of the main casing for connection to an external electrical power source, the terminal means being sealed about the casing to provide a fluid seal;

a food container for positioning within the main casing, the container being of thermally conductive material and forming at least one well compartment for storing a supply of food, said container being electrically insulated from said heating element;

suspension means for engaging said food container within the main casing and suspending said food container in said cavity with said well compartment at least partially submerged within said supply of heating fluid to permit heat to be conveyed from said heating fluid to the interior of the well compartment;

liquid-tight sealant means for sealing the food container about the periphery of the cavity and main casing to retain said heating fluid within said cavity during transport regardless of the position of the case; and a food container cover means of thermally non-conductive material being positioned within the case and over the top surface of the food container to enclose said food storage compartment, means for fixing said food container cover means in place over said food container and securing said food container cover means to said food container when the case is in transport;

said case cover means carrying a plurality of boss members projecting from the bottom side of said case cover means, and adapted for making frictional engagement with the food container cover means to secure said food container cover means to said food compartment when said case cover means is closed.

2. The portable carrying case of claim 1 wherein the food container is in the form of a unitary structure forming a plurality of individual well compartments, each compartment establishing individual exterior side walls spaced from the exterior side walls of each of the other compartments with each side wall of each compartment being at least partially submerged in said heating fluid when said casing is placed in an upright position.

3. The portable carrying case of claim 2 wherein the heating element means includes a temperature control means for sensing the temperature of said liquid and controlling said heating element responsive to the temperature of the heating fluid.

4. The portable carrying case of claim 3 wherein at least one of said compartments of the food container is of different size and depth relative to the size and depth of other of said compartments such that the volume of said heating fluid about the exterior of the compartments varies relative to the size of compartment and the spacing intermediate adjacent compartments.

5. The portable carrying case of claim 4 wherein the suspension means includes a tongue-and-groove interlock wherein the groove is established integral with the interior walls of the main casing forming said cavity and extending about the periphery of said interior walls, and the tongue is established inegral with the food container and extends about the exterior periphery of the food container; and the sealant means includes a sealant sealing said tongue-and-groove interlock.

6. The portable case of claim 5 wherein the heating element includes a substantially flat insulative member, a coil of electrically conductive wire wound about said member, said coil being coated with an electrical insulative means to electrically insulate the wire from the liquid heating fluid, said coil being joined to the terminal means embedded in said casing, said insulative member extending laterally and longitudinally over substantially the entire cross-section of the cavity beneath the bottom-most surface of the food storage container.

7. The portable carrying case of claim 6 wherein said boss members projecting from the bottom side of said case cover are in the form of a plurality of laterally spaced pressure clamps adapted for frictional engagement with eating utensils and supporting said utensils in place.

8. The portable carrying case of claim 7 wherein the food container carries a groove about the outer periphery of the top edge of said compartments and the container cover means establishes a plurality of tongues arranged in a pattern for alignment and engagement within said grooves when said container cover is placed in position over said food container.

9. The portable carrying case of claim 8 wherein said casing cover carries a frictionally detachable hinge means for engaging said casing cover to the main casing and a latch means for securing said casing cover in a closed position over said main casing, said casing cover being removable from said main casing when said latch means is disengaged.

* * * * *